(12) United States Patent
Sadaghiani (10) Patent No.: US 10,929,756 B1
(45) Date of Patent: Feb. 23, 2021

(54) SYSTEMS AND METHODS FOR CONFIGURING AND IMPLEMENTING AN INTERPRETIVE SURROGATE MACHINE LEARNING MODEL

(71) Applicant: Sift Science, Inc., San Francisco, CA (US)

(72) Inventor: Fred Sadaghiani, San Francisco, CA (US)

(73) Assignee: Sift Science, Inc., San Francisco, CA (US)

( * ) Notice: Subject to any disclaimer, the term of this patent is extended or adjusted under 35 U.S.C. 154(b) by 0 days.

(21) Appl. No.: 16/934,060

(22) Filed: Jul. 21, 2020

Related U.S. Application Data (60) Provisional application No. 62/946,652, filed on Dec. 11, 2019.

(51) Int. Cl.
| | |
|---|---|
| *G06N 3/08* | (2006.01) |
| *G06F 9/54* | (2006.01) |
| *G06K 9/62* | (2006.01) |
| *G06F 9/30* | (2018.01) |

(52) U.S. Cl.
CPC .............. *G06N 3/08* (2013.01); *G06F 9/3001* (2013.01); *G06F 9/541* (2013.01); *G06K 9/6256* (2013.01)

(58) Field of Classification Search
None
See application file for complete search history.

(56) References Cited

U.S. PATENT DOCUMENTS

| | | | |
|---|---|---|---|
| 9,978,067 B1* | 5/2018 | Sadaghiani | |
| 2018/0314975 A1* | 11/2018 | Zang | |
| 2019/0303795 A1* | 10/2019 | Khiari | |
| 2020/0097439 A1* | 3/2020 | Sinay | |

OTHER PUBLICATIONS

Jason Brownlee, Ensemble Learning Methods for Deep Learning Neural Networks, Aug. 6, 2019, pp. 1-19 (Year: 2019).*

* cited by examiner

*Primary Examiner* — Syed A Roni
(74) *Attorney, Agent, or Firm* — Padowithz Alce (57) ABSTRACT

Systems and methods for implementing an interpretive proxy model includes evaluating a deep learning model; estimating a subset of a plurality of distinct algorithmic features of the deep learning model as leading contributors of a subject predictive output of the deep learning model; constructing a proxy model using algorithmic features of the deep learning model within the subset of the plurality of distinct algorithmic features; training the proxy model to mirror predictive outputs of the deep learning model; deploying the proxy model alongside the deep learning model based on a completion of the training; and in response to a same input to both the deep learning model and the proxy model, exposing: (1) a predictive output of the deep learning model, and (2) an explanation of the predictive output of the deep learning model based on leading contributing algorithmic features of the proxy model.

14 Claims, 3 Drawing Sheets

```
┌─────────────────────────────────────┐
│  Identifying a Target Complex Model S210  │
└─────────────────────────────────────┘

┌─────────────────────────────────────┐
│  Deconstructing a Target Complex Model  │
│                S220                  │
└─────────────────────────────────────┘

┌─────────────────────────────────────┐
│    Constructing a Mimicking Model S230   │
└─────────────────────────────────────┘

┌─────────────────────────────────────┐
│      Training a Mimicking Model S240     │
└─────────────────────────────────────┘

┌─ ─ ─ ─ ─ ─ ─ ─ ─ ─ ─ ─ ─ ─ ─ ─ ─ ─ ─┐
│    Calibrating the Mimicking Model S245  │
└─ ─ ─ ─ ─ ─ ─ ─ ─ ─ ─ ─ ─ ─ ─ ─ ─ ─ ─┘

┌─────────────────────────────────────┐
│    Deploying the Mimicking Model S250    │
└─────────────────────────────────────┘
```

SYSTEMS AND METHODS FOR CONFIGURING AND IMPLEMENTING AN INTERPRETIVE SURROGATE MACHINE LEARNING MODEL

CROSS-REFERENCE TO RELATED APPLICATIONS

This application claims the benefit of U.S. Provisional Application No. 62/946,652, filed 11 Dec. 2019, which is incorporated in its entirety by this reference.

TECHNICAL FIELD

This invention relates generally to the digital fraud and abuse field, and more specifically to a new and useful system and method for detecting digital fraud or digital abuse and evolving underlying machine learning models in the digital fraud and abuse field.

BACKGROUND

The modern web and Internet enables entities to engage and perform an incalculable amount of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services and/or Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third-parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

BRIEF SUMMARY OF THE INVENTION(S)

In one embodiment, a machine learning-based system for constructing an interpretive surrogate machine learning model in cooperation with a complex machine learning model includes a distributed network of computers implementing a machine learning-based digital threat mitigation service that, in use: evaluates structural characteristics of a target complex machine learning model; identifies a subset of a plurality of distinct algorithmic features of the target complex machine learning model as leading contributors of a subject predictive output of the target complex machine learning model based on the evaluation, wherein the leading contributors relate to algorithmic features of a given machine learning model that satisfy or exceed a contribution threshold for an output of the given machine learning model; constructs a surrogate machine learning model using each of one or more algorithmic features of the target complex machine learning model within the subset of the plurality of distinct algorithmic features; trains the surrogate machine learning model to mirror predictive outputs of the target complex machine learning model; deploys the surrogate machine learning model alongside the target complex machine learning model based on a completion of the training; and in response to a same input to both the target complex machine learning model and the surrogate machine learning model, exposes: (1) a predictive output of the target complex machine learning model, and (2) an explanation of the predictive output of the target complex machine learning model based on one or more leading contributing algorithmic features of the surrogate machine learning model.

In one embodiment, the distributed network of computers further: compute a model transparency metric for the target complex machine learning model, the model transparency metric relating to a model metric that indicates a degree to which a prediction or an output of the target complex machine learning model can be explained in view of one or more algorithmic features of an algorithmic structure of the target complex machine learning model.

In one embodiment, the distributed network of computers further: assesses the model transparency metric against a transparency threshold, wherein the transparency threshold relates to a minimum transparency metric value that, if satisfied, indicates a transparent or an explainable machine learning model, and flags the target complex machine learning model as a non-transparent model if the target complex machine learning model fails to satisfy the transparency threshold.

In one embodiment, the distributed network of computers further: aligns predictive outputs of the surrogate machine learning model to the predictive outputs of the target complex machine learning model based on the training of the surrogate machine learning model with a corpus of training data samples comprising historical training data samples used in training the target complex machine learning model.

In one embodiment, a method for implementing an interpretive surrogate machine learning model in cooperation with a complex machine learning model includes: evaluating structural characteristics of a target complex machine learning model; identifying a subset of a plurality of distinct algorithmic features of the target complex machine learning model as leading contributors of a subject predictive output of the target complex machine learning model based on the evaluation, wherein the leading contributors relate to algorithmic features of a given machine learning model that satisfy or exceed a contribution threshold for an output of the given machine learning model; constructing a surrogate machine learning model using each of one or more algorithmic features of the target complex machine learning model within the subset of the plurality of distinct algorithmic features; training the surrogate machine learning model to mirror predictive outputs of the target complex machine learning model; deploying the surrogate machine learning model alongside the target complex machine learning model based on a completion of the training; and in response to a same input to both the target complex machine learning model and the surrogate machine learning model, exposing: (1) a predictive output of the target complex machine learning model, and (2) an explanation of the predictive output of the target complex machine learning model based on one or more leading contributing algorithmic features of the surrogate machine learning model.

In one embodiment, the target complex machine learning model relates to a machine learning model having a complex structure that renders a rationale underpinning of one or more predictive outputs of the target complex machine learning model indeterminable or unexplainable.

In one embodiment, the surrogate machine learning model relates to a machine learning model configured with one or more of the leading contributing algorithmic features of the target complex machine learning model that, once trained, mimics the predictive outputs of the target complex machine learning model based on receiving a common input as the target complex machine learning model.

In one embodiment, the method includes computing a model transparency metric for the target complex machine learning model, the model transparency metric relating to a model metric that indicates a degree to which a prediction or an output of the target complex machine learning model can be explained in view of one or more algorithmic features of an algorithmic structure of the target complex machine learning model.

In one embodiment, the method includes assessing the model transparency metric against a transparency threshold, wherein the transparency threshold relates to a minimum transparency metric value that, if satisfied, indicates a transparent or an explainable machine learning model, and flagging the target complex machine learning model as a non-transparent model if the target complex machine learning model fails to satisfy the transparency threshold.

In one embodiment, if the target complex machine learning model is flagged as the non-transparent model, automatically causing the construction of the surrogate machine learning model based on the flagging.

In one embodiment, the method includes testing the target complex machine learning model, wherein the testing includes: loading a corpus of test stimulus to the target complex machine learning model; in response to generating an output by the target complex machine learning model, virtually deconstructing the target complex machine learning model to: (a) expose each of the plurality of distinct algorithmic features that define the target complex machine learning model, and (b) expose each distinct weight value or distinct coefficient value accompanying each of the plurality of distinct algorithmic features.

In one embodiment, the method includes ranking each of the plurality of distinct algorithmic features of the target complex machine learning model based on the distinct weight value or the distinct coefficient value accompanying each of the plurality of distinct algorithmic features; and selecting the subset of the plurality of distinct algorithmic features of the target complex machine learning model that satisfy a selection threshold.

In one embodiment, the method includes bifurcating the plurality of distinct algorithmic features of the target complex machine learning model into at least two distinct subsets including: (a) a first subset that identifies the one or more distinct algorithmic features of the target complex machine learning model that are likely to drive or lead a contribution to a value of an output of the target complex machine learning model, and (b) a second subset that identifies the one or more distinct algorithmic features that are likely not to drive the value of the output of the target complex machine learning model, wherein the subset of a plurality of distinct algorithmic features comprises the first subset.

In one embodiment, the surrogate machine learning model includes a linear machine learning model having transparency attributes that enables a deciphering of the target complex machine learning model based on values of the one or more algorithmic features of the surrogate machine learning model after computing based on a common input to both the target complex machine learning model and the surrogate machine learning model.

In one embodiment, the method includes aligning predictive outputs of the surrogate machine learning model to the predictive outputs of the target complex machine learning model based on the training of the surrogate machine learning model with a corpus of training data samples comprising historical training data samples used in training the target complex machine learning model.

In one embodiment, a method for implementing an interpretive proxy model in cooperation with a deep learning model includes evaluating structural characteristics of a deep learning model; estimating a subset of a plurality of distinct algorithmic features of the deep learning model as leading contributors of a subject predictive output of the deep learning model based on the evaluation, wherein the leading contributors relate to algorithmic features of a given deep learning model that satisfy or exceed a contribution threshold for an output of the given deep learning model; constructing a proxy model using each of one or more algorithmic features of the deep learning model within the subset of the plurality of distinct algorithmic features; training the proxy model to mirror predictive outputs of the deep learning model; deploying the proxy model alongside the deep learning model based on a completion of the training; and in response to a same input to both the deep learning model and the proxy model, exposing: (1) a predictive output of the deep learning model, and (2) an explanation of the predictive output of the deep learning model based on one or more leading contributing algorithmic features of the proxy model.

In one embodiment, the deep learning model comprises a non-linear machine learning model, and the proxy model comprises a linear machine learning model.

In one embodiment, the method includes testing the deep learning model, wherein the testing includes: loading a corpus of test stimulus to the deep learning model; in response to generating an output by the deep learning model, virtually deconstructing the deep learning model to: (a) expose each of the plurality of distinct algorithmic features that define the deep learning model, and (b) expose each distinct weight value or distinct coefficient value accompanying each of the plurality of distinct algorithmic features.

In one embodiment, the method includes ranking each of the plurality of distinct algorithmic features of the deep learning model based on the distinct weight value or the distinct coefficient value accompanying each of the plurality of distinct algorithmic features; and selecting the subset of the plurality of distinct algorithmic features of the deep learning model that satisfy a selection threshold.

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

1. Overview

As discussed above, digital threats are abounding and continue to evolve to circumvent existing digital fraud detection technologies. The evolving nature of digital threats compounded with the great number of transactions, events, actions, and/or activities (exceeding billions in number) occurring over the web and/or Internet highlight the many deficiencies of traditional digital fraud detection and threat mitigation implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital fraud and abuse threats stemming from the malicious or fraudulent activities.

The advanced technology platform of many embodiments of the present application employs a robust ensemble of machine learning models and related systems that operate to ingest the great number of digital activities performed and events occurring over the web. Accordingly, using these finely tuned and perpetually evolving and tunable machine learning models, a system implementing the several embodiments of the present application can predict a threat level and/or classify a digital threat with high accuracy and, in some embodiments, in real-time (e.g., as the event is occurring or shortly thereafter) compute a digital threat score for each event or activity that is received by the system.

The digital threat score may be exposed via a score application program interface (API) that may function to interact with various endpoints of the digital threat mitigation platform. Specifically, the score API may function to interact with one or more computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or current the digital events to mitigate or eliminate a digital threat associated therewith.

2. System for Digital Fraud and/or Abuse Detection and Scoring

Figure 1:
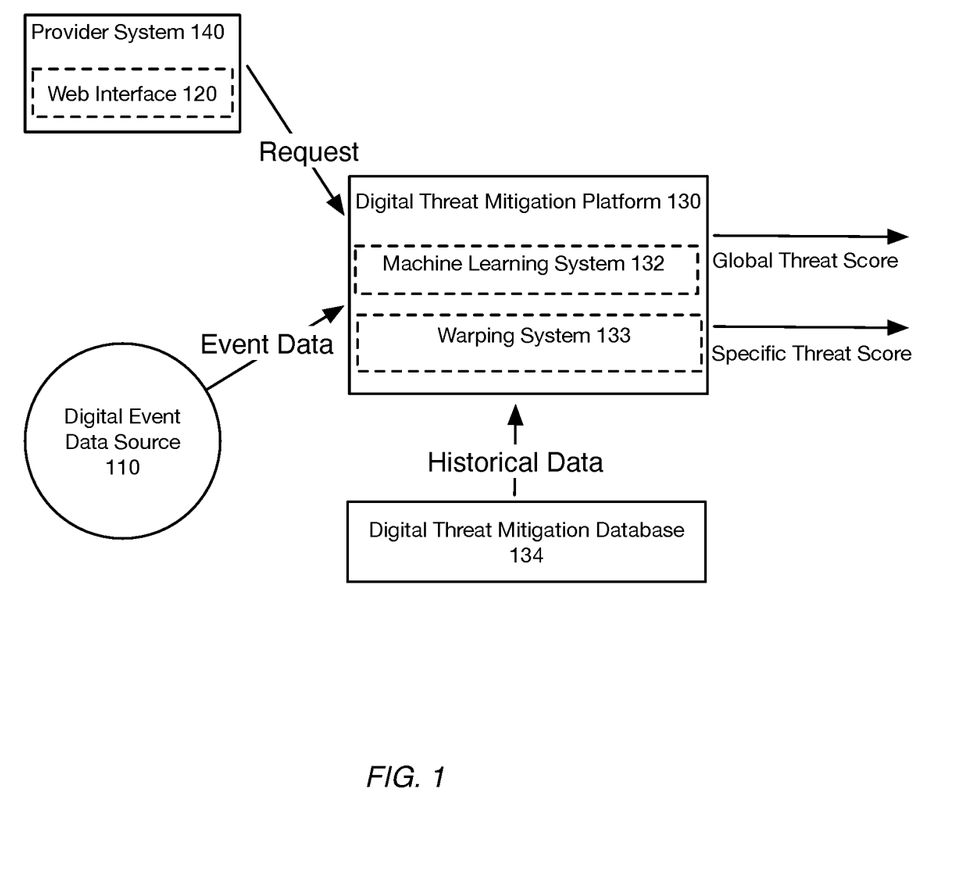
FIG. 1 illustrates a schematic representation of a system in accordance with one or more embodiments of the present application.

As shown in FIG. 1, a system 100 for detecting digital fraud and/or digital abuse includes one or more digital event data sources 110, a web interface 120, a digital threat mitigation platform 130, and a service provider system 140.

The system 100 functions to enable a prediction of multiple types of digital abuse and/or digital fraud within a single stream of digital event data. The system 100 provides web interface 120 that enables users to generate a request for a global digital threat score and additionally, make a request for specific digital threat scores for varying digital abuse types. After or contemporaneously with receiving a request from the web interface 120, the system 100 may function to collect digital event data from the one or more digital event data sources 110. The system 100 using the digital threat mitigation platform 130 functions to generate a global digital threat score and one or more specific digital threat scores for one or more digital abuse types that may exist in the collected digital event data.

The one or more digital event data sources 110 function as sources of digital events data and digital activities data, occurring fully or in part over the Internet, the web, mobile applications, and the like. The one or more digital event data sources 110 may include a plurality of web servers and/or one or more data repositories associated with a plurality of service providers. Accordingly, the one or more digital event data sources no may also include the service provider system 140.

The one or more digital event data sources no function to capture and/or record any digital activities and/or digital events occurring over the Internet, web, mobile applications (or other digital/Internet platforms) involving the web servers of the service providers and/or other digital resources (e.g., web pages, web transaction platforms, Internet-accessible data sources, web applications, etc.) of the service providers. The digital events data and digital activities data collected by the one or more digital event data sources 110 may function as input data sources for a machine learning system 132 of the digital threat mitigation platform 130.

The digital threat mitigation platform 130 functions as an engine that implement at least a machine learning system 132 and, in some embodiments, together with a warping system 133 to generate a global threat score and one or more specific digital threat scores for one or more digital abuse types. The digital threat mitigation platform 130 functions to interact with the web interface 120 to receive instructions and/or a digital request for predicting likelihoods of digital fraud and/or digital abuse within a provided dataset. The digital threat mitigation engine 130 may be implemented via one or more specifically configured web or private computing servers (or a distributed computing system) or any suitable system for implementing system 100 and/or method 200.

The machine learning system 132 functions to identify or classify features of the collected digital events data and digital activity data received from the one or more digital event data sources 110. The machine learning system 132 may be implemented by a plurality of computing servers (e.g., a combination of web servers and private servers) that implement one or more ensembles of machine learning models. The ensemble of machine learning models may include hundreds and/or thousands of machine learning models that work together to classify features of digital events data and namely, to classify or detect features that may indicate a possibility of fraud and/or abuse. The machine learning system 132 may additionally utilize the input from the one or more digital event data sources no and various other data sources (e.g., outputs of system 100, system 100 derived knowledge data, external entity-maintained data, etc.) to continuously improve or accurately tune weightings associated with features of the one or more of the machine learning models defining the ensembles.

The warping system 133 of the digital threat mitigation platform 130, in some embodiments, functions to warp a global digital threat score generated by a primary machine learning ensemble to generate one or more specific digital threat scores for one or more of the plurality of digital abuse types. In some embodiments, the warping system 133 may function to warp the primary machine learning ensemble, itself, to produce a secondary (or derivative) machine learning ensemble that functions to generate specific digital threat scores for the digital abuse and/or digital fraud types. Additionally, or alternatively, the warping system 130 may function to implement a companion machine learning model or a machine learning model that is assistive in determining whether a specific digital threat score should be generated for a subject digital events dataset being evaluated at the primary machine learning model. Additionally, or alternatively, the warping system 133 may function to implement a plurality of secondary machine learning models defining a second ensemble that may be used to selectively determine or generate specific digital threat scores. Accordingly, the warping system 133 may be implemented in various manners including in various combinations of the embodiments described above.

The digital threat mitigation database 134 includes one or more data repositories that function to store historical digital event data. The digital threat mitigation database 134 may be in operable communication with one or both of an events API and the machine learning system 132. For instance, the machine learning system 132 when generating global digital threat scores and specific digital threat scores for one or more specific digital abuse types may pull additional data from the digital threat mitigation database 134 that may be assistive in generating the digital threat scores.

The ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in generating endpoint health intelligence and/or other data relevant to the system 100.

The service provider 140 functions to provide digital events data to the one or more digital event data processing components of the system 100. Preferably, the service provider 140 provides digital events data to an events application program interface (API) associated with the digital threat mitigation platform 130. The service provider 140 may be any entity or organization having a digital or online presence that enable users of the digital resources associated with the service provider's online presence to perform transactions, exchanges of data, perform one or more digital activities, and the like.

The service provider 140 may include one or more web or private computing servers and/or web or private computing devices. Preferably, the service provider 140 includes one or more client devices functioning to operate the web interface 120 to interact with and/or communication with the digital threat mitigation engine 130.

The web interface 120 functions to enable a client system or client device to operably interact with the remote digital threat mitigation platform 130 of the present application. The web interface 120 may include any suitable graphical frontend that can be accessed via a web browser using a computing device. The web interface 120 may function to provide an interface to provide requests to be used as inputs into the digital threat mitigation platform 130 for generating global digital threat scores and additionally, specific digital threat scores for one or more digital abuse types. In some embodiments, the web interface 120 includes an application program interface that is in operable communication with one or more of the computing servers or computing components of the digital threat mitigation platform 130.

The web interface 120 may be used by an entity or service provider to make any suitable request including requests to generate global digital threat scores and specific digital threat scores. In some embodiments, the web interface 120 comprises an application programming interface (API) client and/or a client browser.

Figure 2:
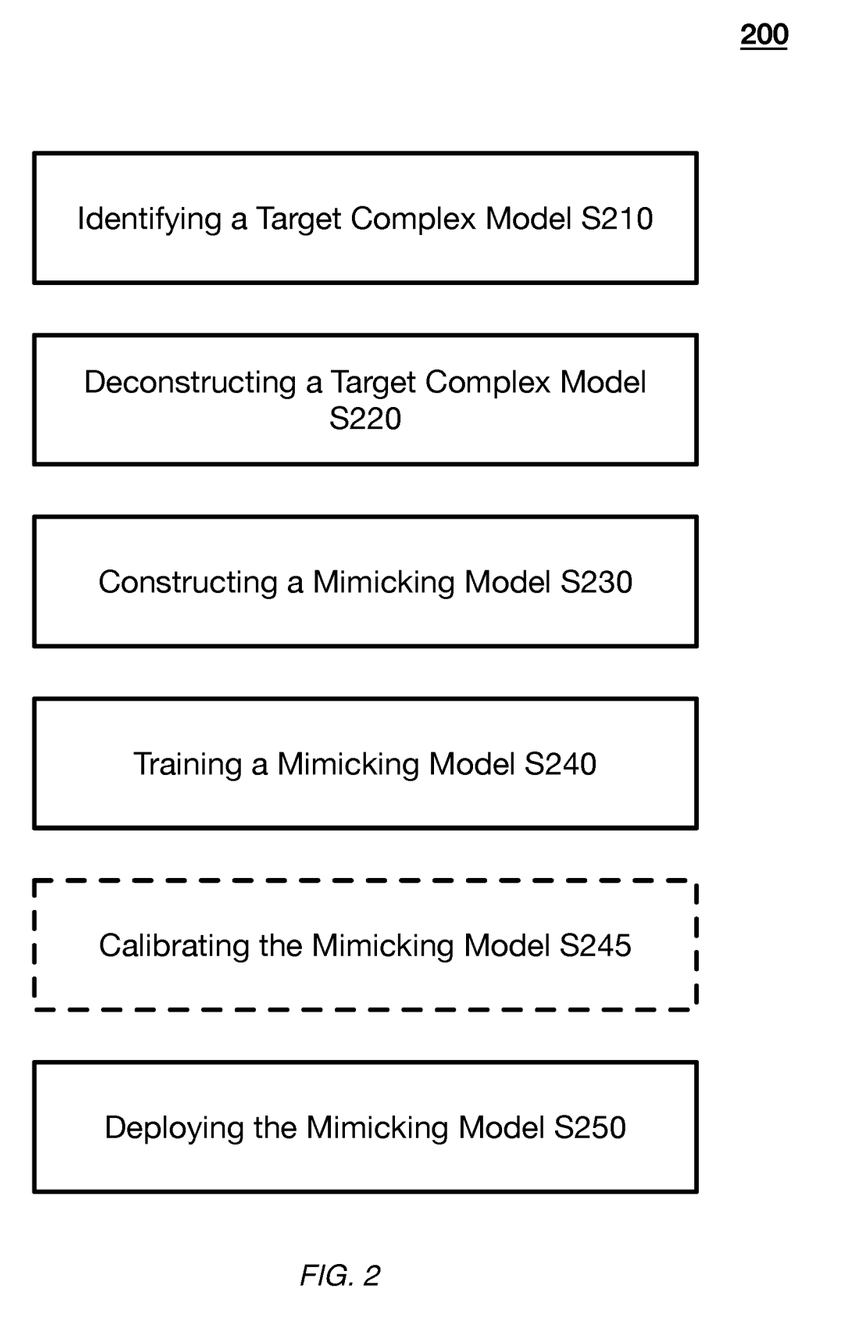
FIG. 2 illustrates an example method in accordance with one or more embodiments of the present application.
Figure 3:
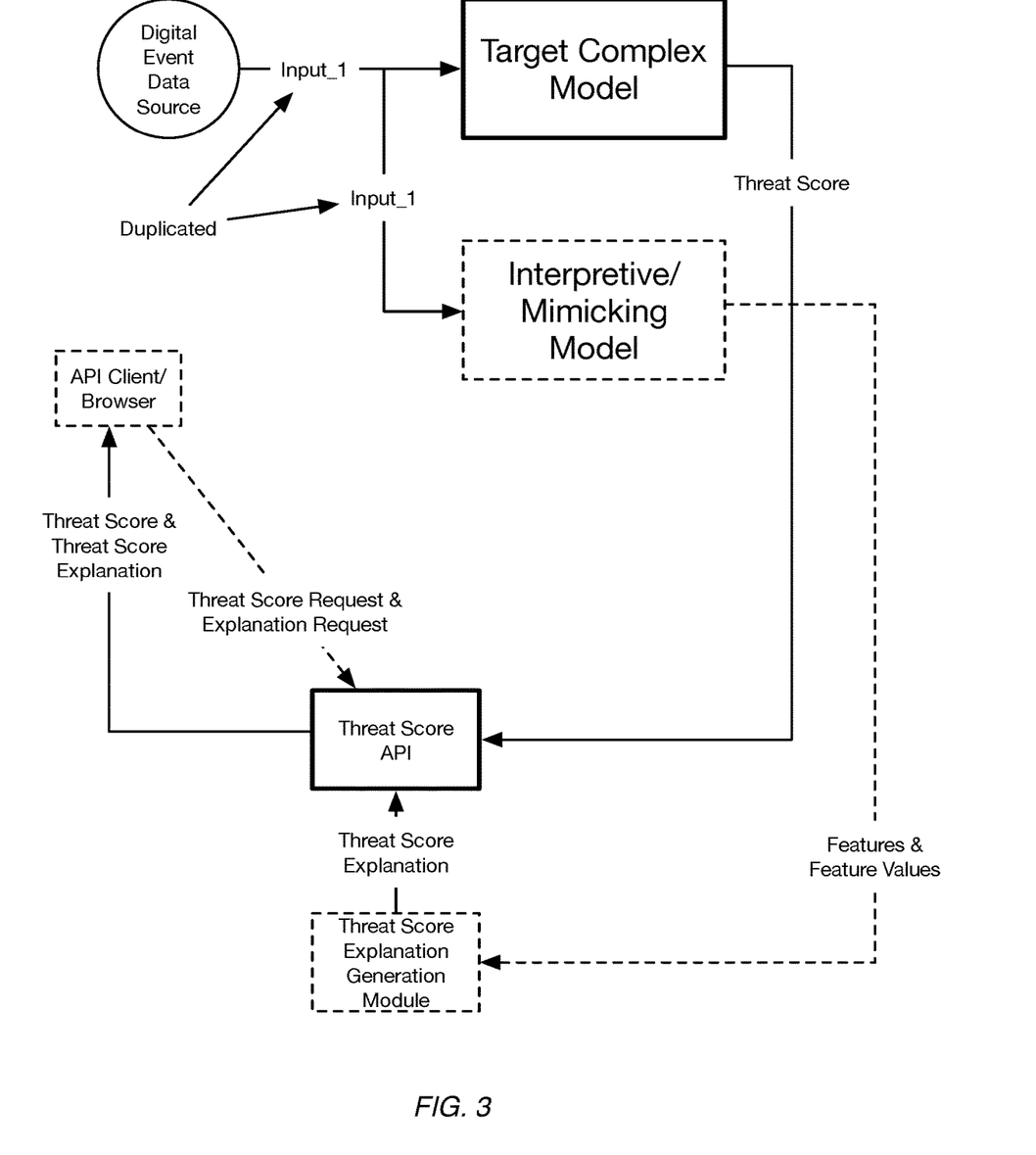
FIG. 3 illustrates an example schematic of a digital threat mitigation platform in accordance with one or more embodiments of the present application.

Additionally, as shown in FIG. 1-FIG. 3, the systems and methods described herein may implement the digital threat mitigation platform/service in accordance with the one or more embodiments described in the present application as well as in the one or more embodiments described in U.S. patent application Ser. No. 15/653,373, which is incorporated by reference in its entirety.

3. Method for Constructing an Interpretive Surrogate Model Service

As shown in FIG. 2, the method 200 for constructing an interpretive surrogate machine learning model includes identifying a target complex model S210, deconstructing a target complex model S220, constructing a mimicking model S230, training a cognate mimicking model S240, and deploying the cognate mimicking model S250. The method 200 optionally includes calibrating the mimicking model to the target complex model S245.

3.1 Target Complex Model Identification

S210, which includes identifying a target complex model, may function to identify a target (deep) machine learning model having or relating to a complex structure that may render a rationale underpinning a predictive output of the target machine learning model indeterminable, unexplainable, or enigmatic. That is, in some embodiments, a relationship between an operation of the target complex model in response to an input or stimulus and the predictions or output of the target complex model may not be explained without significant effort (e.g., effort exceeding an effort maximum threshold or the like). Accordingly, a lack of transparency in such target machine learning models increase inefficiencies in developing an explanation of the computations that drive a resulting output of the target machine learning model. In some embodiments, the target machine learning model having a complex structure may be referred to herein as a black box model and/or a target complex model. In one or more embodiments, the target complex model may include one or more types of nonlinear (algorithms) models and/or deep learning models, such as an artificial neural network or the like.

In one or more embodiments, S210 may, additionally, or alternatively, function to compute a transparency metric for a target complex model. A transparency metric, as referred to herein, preferably relates to a model metric that indicates a level or a degree to which a prediction or an output of a target complex model may be explained based on an ability to efficiently correspond one or more model features of an algorithmic structure of the target complex model and associated feature/structure values as main drivers or primary model signals underpinning a prediction or an output of the target complex model. Stated differently, in some embodiments, a transparency metric relates to value indicating an ability to explain or not explain an operation of the target complex model in producing a prediction resulting from an input into the target complex model by specifically pointing to one or more algorithmic structures/features of the target complex model as the primary reasons for a value of the prediction of the complex model. Additionally, or alternatively, the transparency metric may relate to a value indicating a degree of explainability of a subject machine learning model.

A computed value of a (model) transparency metric, in one or more embodiments, typically lies along a predetermined transparency continuum or spectrum comprising a range of values for the transparency metric in ascending or descending order. In a preferred embodiment, a higher value for a transparency metric along the transparency continuum may indicate a higher relative level of transparency and correspondingly, a higher level of explicability of a target complex model. Conversely, a lower value of a transparency metric for a given target complex model may indicate a lower relative level or degree of transparency and correspondingly, a lower level of explicability. In one or more embodiments, an inexplicable target complex model or a target complex model having a relatively lower level of explicability, according to the continuum, may include a model in which one or more model features and associated values of the one or more model features driving a predictive output of the target complex model may be difficult to identify (e.g., explicability below a (transparency) threshold).

Additionally, or alternatively, S210 may function to assess a transparency and/or an explicability of a target complex model based on a computed value for a transparency metric (e.g., transparency metric value) of the target complex model. In one or more embodiments, S210 may function to assess the transparency of the target complex model based on an evaluation of the transparency metric value of the target complex model against a non-transparency threshold, which is sometimes referred to herein as an inexplicability threshold or transparency threshold. In one or more embodiments, the non-transparency threshold may be a predetermined value or a dynamic value determined based on a (perceived) complexity of the target complex model and/or model characteristics of the target complex mode. In a preferred embodiment, the non-transparency threshold relates to a minimum degree of transparency required to be considered a transparent model such that if or when the minimum degree of transparency is not met by a computed transparency metric for a given model, then the given model may be considered a non-transparent model, opaque model, or inexplicably complex model. In one or more embodiments, a designation of non-transparent or opaque and the line may trigger or cause a system implementing the method 200 to automatically construct a surrogate model for explaining the (opaque/non-transparent) target complex model.

3.2 Complex Model Deconstruction

S220, which includes evaluating a target complex model, may function to evaluate one or more operational characteristics and/or one or more structural characteristics of a target complex model to estimate one or more structural or algorithmic features that may be drivers of or primary contributors to the predictive outputs of the target complex model. In some embodiments, S220 may include a virtual deconstruction of the target complex model that enables an identification of one or more structural features of the target complex model that contribute significantly (e.g., drivers) to an output of the target complex model. That is, while a target complex model may include a large number of model features and/or associated weights that inform an output or a prediction of the model, S220 may function to identify a subset of the model features of the target complex model that generally influence and/or contribute to a high degree in generating a value of the output or the prediction of the target complex model.

In one or more embodiments, S220 may function to identify the subset of the model features of the target complex model based on a testing of the target complex model. That is, based on a testing, S220 may function to expose each of the plurality of model features of the target complex model and their associated weighting or coefficient values to thereby identify the respective contributions of each model feature to an output of the target complex model. In such embodiments, S220 may function define a corpus of test stimulus, which may include a group of model input or the like. The corpus of test stimulus may include randomly sampled historical model input, randomly generated model input (e.g., synthesized, fabricated model input, etc.), and/or the like.

In one or more embodiments, in testing the target complex model, S220 may function to load a corpus of test stimulus to the target complex model. In response to the test stimulus, the target complex model may generate a plurality of outputs with each of the plurality of outputs corresponding to a distinct stimulus input of the corpus of test stimulus. Accordingly, for each distinct stimulus input loaded to the target complex model, S220 may function to parse the target complex model to thereby expose and inspect each of the plurality of model features and their respective values.

Additionally, or alternatively, S220 may function to localize the contributory or primary model features of the target complex model based on an evaluation of the exposed model features and their respective values resulting from each test stimulus. In one embodiment, S220 may function to evaluate each distinct model feature and its associated value of the target complex model against a contributor feature threshold to identify whether a subject distinct model feature is a high (strong) contributor or a low (weak) contributor to a corresponding output of the target complex model. In some embodiments, the contributor feature threshold comprises a global threshold or a selection threshold that may be applied to any or all of the distinct model features irrespective of the characteristics of the model feature. In one or more embodiments, the contributor feature threshold comprises a feature-specific threshold that may be a threshold tailored according to a distinct model feature of the target complex model. In such embodiments, S220 may function to compute or apply a distinct feature-specific threshold for each distinct model feature. Additionally, the contributor feature threshold may be a predetermined value (e.g., a minimum ranking value or the like) or a dynamic value that is changed according to one or more characteristics of a feature of the target complex model, an input to the target complex model, and/or an output of the target complex model. Additionally, or alternatively, in some embodiments, S220 may function to rank each of the model (algorithmic) features of the target complex model and select a subset of the ranked model features based on weight or coefficient value accompanying each of the distinct model features of the target complex model.

Accordingly, based on or in response to the evaluation of each of the model features of the target complex model against a contributor feature threshold, S220 may function to localize each of distinct model feature of the target complex model that are leading contributors to outputs of the target complex model. That is, in one implementation, S220 may function to identify the distinct model features that satisfy and/or exceed a contributor feature threshold as leading contributors or leading contributory model features of the target complex model.

In some embodiments, S220 may function to identify and/or aggregate the leading contributory model features of a target complex model into a first subset of model features defining a consequential model feature set (also referred to herein as "leading contributory model features") of the target complex model. Additionally, or alternatively, S220 may function to aggregate the remaining model features other than the leading contributory model features into a second subset of model features defining an inconsequential model feature set. Accordingly, S220 may function to bifurcate the plurality of distinct model features of a target complex model into at least two distinct subsets identifying the one or more model features that are likely to drive or lead a contribution to a value of an output of the target complex model and that identify the one or more model features that are likely not to drive the value of the output of the target complex model.

In a preferred embodiment, S220 may function to automatically perform an evaluation of the target complex model based on or in response to a computed transparency metric value of the target model satisfying or exceeding a non-transparency threshold or a transparency threshold.

3.3 Mimicking Non-Complex (Explicable/Interpretative) Model Construction

S230, which includes constructing a mimicking model, may function to construct a cognate or surrogate machine learning model that may be capable of mimicking predictions or outputs a target complex model. That is, in a preferred embodiment, given a same set of model inputs into the target complex model and the cognate mimicking model, both of the target complex model and the cognate mimicking model should may output a same predictive output or a substantially same predictive output. Thus, in some embodiments, a surrogate machine learning model may function as a companion model or proxy model to the target complex model and therefore, deployed in parallel for evaluating a same set of inputs.

In a preferred embodiment, S230 may function to construct the cognate mimicking model based on leading contributing model features of a target complex model. In one embodiment, S230 may function to build the cognate mimicking model using the first subset of model features which may include the consequential model feature set or the leading contributory model features of the target complex model which the cognate mimicking model may function to shadow or mimic in its respective outputs.

In a preferred embodiment, a cognate mimicking model for a corresponding target complex model preferably includes a linear machine learning model having a sufficient transparency attributes that enables a deciphering of the target complex model based on values of the structural model features/components of the cognate mimicking model. That is, while the target complex model may not be transparent and may be considered inexplicable, the cognate mimicking model may be transparent and explicable such that model features of the cognate mimicking model that drive one or more outputs thereof may be easily exposed and potentially used in building a rationale or an explanation of a corresponding or cognate output of the target complex model.

In one embodiment, S230 may function to construct a plurality of distinct cognate mimicking models based on distinct arrangements and/or combinations of the leading contributory model feature set of the target complex model. In such embodiments, S230 may construct an ensemble of cognate mimicking models that includes a combination of a subset of or all the plurality of distinct cognate mimicking models. In this way, the ensemble of cognate mimicking models may allow for a robust system for handling varying and/or distinct types of model inputs. That is, in some embodiments, distinct combinations of the leading contributory model feature set may be combined and used to build a plurality of distinct cognate mimicking models for a single target complex model.

3.4 Mimicking Non-Complex Model Training/Validation

S240, which includes training a cognate mimicking model, may function to implement a training of the cognate mimicking model. In some embodiments, S240 may function to implement a training of each of a plurality of distinct cognate mimicking models for a given target complex model. In such embodiments, a training of the plurality of distinct cognate mimicking models may be performed in parallel. In a preferred embodiments, an objective of the training of the cognate mimicking model may be to enable the cognate mimicking model to generate outputs that align with and/or correspond to outputs of the target complex model. Accordingly, S240 may function to train a cognate mimicking model of a target complex model until outputs of the cognate mimicking model satisfy or exceed an output matching threshold or the like. In such embodiments, the output matching threshold may relate to a minimum performance metric of a model (e.g., accuracy, efficiency or predictive speed, and/or the like). The output matching threshold may be set in any suitable manner and may include a predetermined performance metric and predetermined performance metric value.

In a first implementation, S240 may function to define a corpus of training data comprising a corpus of historical training data samples used in training the target complex model. In such implementation, S240 may function to perform a training of the cognate mimicking model in an offline mode using primarily or only trailing model inputs and/or historical training data samples.

In a second implementation, S240 may function to define a corpus of training data comprising live model input instances loaded to a live version (e.g., online version) of the target complex model for outputting live predictions. That is, in such implementation, the corpus of training data for implementing a training of a cognate mimicking model may include a plurality of model input data that were used as input into an online or live version of the target complex model. Thus, the corpus of training data may include real-world model inputs.

In a third implementation, S240 may function to define a corpus of training data comprising live model input data that may be loaded to an online version of the target complex model together with a corpus of historical training data used to train the target complex model. In this implementation, S240 may function to structure a composition of the corpus of training data in any suitable manner including biasing the composition to include a greater proportion of one of the live model input data and the historical training data.

Additionally, or alternatively, S240 may function to set a training and/or validation configuration for the corpus of training data. In one embodiment, S240 may function to configure the corpus to make available only a subset or portion of the data within the corpus for training the cognate mimicking model, during a first training phase. In such embodiment, S240 may function to configure the corpus to make available a second subset of the data within the corpus during a second phase of validating the cognate mimicking model. Accordingly, in response to a completion of the first phase, S220 may function to enable access and/or a use of the second subset of the training data for purposes of validating the cognate mimicking model. For example, S240 may function to configure the corpus of training data such that 55% of data from the corpus is sampled for training the cognate mimicking model and such that 10% of data from the corpus is provided as input for validating and/or testing a performance of the cognate mimicking model after training (i.e., the first phase) is completed.

It shall be noted that any suitable configuration and/or setting may be applied to the corpus of training data for the purposes of training and/or validating the cognate mimicking model.

3.45 Calibrating the Mimicking Model to the Target Complex Model

Optionally, or additionally, S245, which includes calibrating the mimicking model to the target complex model, may function to calibrate the mimicking model to match or substantially match (e.g., within a predetermined level of confidence) operating characteristics of the target complex model. Accordingly, the mimicking model may be calibrated in accordance with the techniques and methods described in U.S. Pat. No. 10,339,472, which is incorporated herein in its entirety by this reference.

Additionally, or optionally, S245 may function to test a behavior of the target complex model to confirm that the classification or predictive accuracy of the mimicking model is in alignment with a classification and/or predictive accuracy of the target complex model. Accordingly, S245 may function to enable same digital event data or model input data to be received by the target complex model as well as the mimicking model. In such embodiments, S245 may function to operate the mimicking model in a shadow mode (e.g., offline) in which the output of the mimicking model are not exposed and may function to continue to operate the target complex model in a live mode in which the predictions of the target complex model are exposable to a subscriber to the machine learning-based threat mitigation service (e.g., the system or service implementing the method 200). S245 may subsequently generate an ROC curve for each of the target complex model and the mimicking model to verify that the area under curve (AUC) of the ROC curve for the mimicking model matches or substantially matches the AUC of the ROC curve for the target complex model. In the case that the AUC of the ROC curve of the mimicking model matches or substantially matches the AUC of the ROC curve of the complex target model, S245 may function to validate the mimicking model and transition the mimicking model into a live deployment.

Additionally, or alternatively, S245 may function to calibrate the mimicking model such that the scores output by the mimicking model are in general alignment or match a quantiles distribution of the threat scores or predictive output of the target complex model.

3.6 Mimicking Non-Complex Model Deployment

S250, which includes deploying the cognate mimicking model, may function to implement a live or online deployment of the cognate mimicking model alongside a corresponding target complex model.

In a first implementation, S250 may function to deploy the cognate mimicking model such that it operates in parallel with a corresponding target complex model. In this first implementation, live model inputs to the target complex model may be simultaneously or contemporaneously loaded to the cognate mimicking model.

In a second implementation, S250 may function to deploy the cognate mimicking model such that it operates in a trailing manner with a corresponding target complex model. In this first implementation, live model inputs to the target complex model may be loaded to the cognate mimicking model after the model inputs are loaded to the target complex model. In this second implementation, S250 may function to load to the cognate mimicking model only those model inputs associated with a specific (API) request for an output or an explanation of an output of the target complex model.

In a third implementation, S250 may function to deploy the target complex model in a live or online mode in which predictive outputs of the target complex model may be publicly exposed or returned and deploy the cognate mimicking model in a shadow mode or offline mode in which predictive outputs of the cognate mimicking model are not publicly exposed or returned. In this third implementation, only one or more of the algorithmic features and/or accompanying weights of the features may be returned or publicly exposed together with the predictive output of the target complex model.

Accordingly, in one or more embodiments, S250 may function to load same model inputs to the cognate mimicking model and the target complex model. In such embodiments, each of the cognate mimicking model and the target complex model may function to generate corresponding outputs based on the model inputs. In a preferred embodiment, the outputs of the cognate mimicking model based on a model input may include a prediction or other generated output value together with a set of model features of the cognate model and their associated values. That is, S250 may function to extract multiple distinct outputs from the cognate mimicking model that include [1] structural or feature values of the cognate mimicking model and [2] a model output value (e.g., a threat score, threat label, or the like) based on a single model input to the cognate mimicking model.

Additionally, or alternatively, while both the target complex model and the cognate mimicking model may function to receive a same model input, preferably, only the model output (e.g., threat score, threat label, etc.) of the target complex model may be exposed to a requestor or a subscriber and the model outputs of the cognate mimicking model may be used as inputs to build an explanation of the model output of the target complex model. For example, each of a target complex model and a corresponding cognate mimicking model may function to receive a same input set of data that includes online activity data of an online user. Based on the input set of data, the target complex model may generate a threat score of 79 (on a scale of 0-100) and the cognate mimicking model may function to output model features and associated values of the model features that are used to build an explanation of the threat score of the target complex model. In such example, the model features and values may be [1] proxy use=1 or YES, [2] device fingerprint duplication=100, and [3] number of listings=50. In such example, an explanation that may be constructed based on the model features and model feature values of the cognate mimicking model may be "the threat score of the online user activity is 79 because the online user is using a proxy AND the user shares the same device fingerprint with 100 other users AND the user created 50 listings in the past minute".

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A method for implementing an interpretive surrogate machine learning model in cooperation with a complex machine learning model, the method comprising:
    evaluating structural characteristics of a target complex machine learning model;
    identifying a subset of a plurality of distinct algorithmic features of the target complex machine learning model as leading contributors of a subject predictive output of the target complex machine learning model based on the evaluation, wherein the leading contributors relate to algorithmic features of a given machine learning model that satisfy or exceed a contribution threshold for an output of the given machine learning model;
    constructing a surrogate machine learning model using each of one or more algorithmic features of the target complex machine learning model within the subset of the plurality of distinct algorithmic features;
    training the surrogate machine learning model to mirror predictive outputs of the target complex machine learning model;
    deploying the surrogate machine learning model and the target complex machine learning model based on a completion of the training; and
    in response to a same input to both the target complex machine learning model and the surrogate machine learning model, exposing:
        (1) a predictive output of the target complex machine learning model, and
        (2) an explanation of the predictive output of the target complex machine learning model based on one or more leading contributing algorithmic features of the surrogate machine learning model, wherein
    the surrogate machine learning model includes a linear machine learning model having transparency attributes that enables a deciphering of the target complex machine learning model based on values of the one or more algorithmic features of the surrogate machine learning model after computing based on the same input to both the target complex machine learning model and the surrogate machine learning model.

2. The method according to claim 1, wherein
    the target complex machine learning model relates to a machine learning model having a complex structure that renders a rationale underpinning of one or more predictive outputs of the target complex machine learning model indeterminable or unexplainable.

3. The method according to claim 1, wherein
    the surrogate machine learning model relates to a machine learning model configured with one or more of the leading contributing algorithmic features of the target complex machine learning model that, once trained, mimics the predictive outputs of the target complex machine learning model based on receiving a common input as the target complex machine learning model.

4. The method according to claim 1, further comprising:
computing a model transparency metric for the target complex machine learning model, the model transparency metric relating to a model metric that indicates an explicability of a prediction or an output of the target complex machine learning model can be explained in view of one or more algorithmic features of an algorithmic structure of the target complex machine learning model.

5. The method according to claim 4, further comprising:
assessing the model transparency metric against a transparency threshold, wherein the transparency threshold relates to a minimum transparency metric value that, if satisfied, indicates a transparent or an explainable machine learning model, and
flagging the target complex machine learning model as a non-transparent model if the target complex machine learning model fails to satisfy the transparency threshold.

6. The method according to claim 5, wherein
if the target complex machine learning model is flagged as the non-transparent model, automatically causing the construction of the surrogate machine learning model based on the flagging.

7. The method according to claim 1, further comprising:
testing the target complex machine learning model, wherein the testing includes:
loading a corpus of test stimulus to the target complex machine learning model;
in response to generating an output by the target complex machine learning model, virtually deconstructing the target complex machine learning model to:
(a) expose each of the plurality of distinct algorithmic features that define the target complex machine learning model, and
(b) expose each distinct weight value or distinct coefficient value accompanying each of the plurality of distinct algorithmic features.

8. The method according to claim 7, further comprising:
ranking each of the plurality of distinct algorithmic features of the target complex machine learning model based on the distinct weight value or the distinct coefficient value accompanying each of the plurality of distinct algorithmic features; and
selecting the subset of the plurality of distinct algorithmic features of the target complex machine learning model that satisfy a selection threshold.

9. The method according to claim 1, further comprising:
bifurcating the plurality of distinct algorithmic features of the target complex machine learning model into at least two distinct subsets including:
(a) a first subset that identifies the one or more distinct algorithmic features of the target complex machine learning model that are likely to drive or lead a contribution to a value of an output of the target complex machine learning model, and
(b) a second subset that identifies the one or more distinct algorithmic features that are likely not to drive the value of the output of the target complex machine learning model, wherein
the subset of the plurality of distinct algorithmic features comprises the first subset.

10. The method according to claim 1, further comprising:
aligning predictive outputs of the surrogate machine learning model to the predictive outputs of the target complex machine learning model based on the training of the surrogate machine learning model with a corpus of training data samples comprising historical training data samples used in training the target complex machine learning model.

11. A method for implementing an interpretive proxy model in cooperation with a deep learning model, the method comprising:
evaluating structural characteristics of a deep learning model;
testing the deep learning model, wherein the testing includes:
loading a corpus of test stimulus to the deep learning model;
in response to generating an output by the deep learning model, virtually deconstructing the deep learning model to:
(a) expose each of a plurality of distinct algorithmic features that define the deep learning model, and
(b) expose each distinct weight value or distinct coefficient value accompanying each of the plurality of distinct algorithmic features;
estimating a subset of a plurality of distinct algorithmic features of the deep learning model as leading contributors of a subject predictive output of the deep learning model based on the evaluation, wherein the leading contributors relate to algorithmic features of a given deep learning model that satisfy or exceed a contribution threshold for an output of the given deep learning model;
constructing a proxy model using each of one or more algorithmic features of the deep learning model within the subset of the plurality of distinct algorithmic features;
training the proxy model to mirror predictive outputs of the deep learning model;
deploying the proxy model and the deep learning model based on a completion of the training; and
in response to a same input to both the deep learning model and the proxy model, exposing:
(1) a predictive output of the deep learning model, and
(2) an explanation of the predictive output of the deep learning model based on one or more leading contributing algorithmic features of the proxy model.

12. The method according to claim 11, wherein
the deep learning model comprises a non-linear machine learning model, and
the proxy model comprises a linear machine learning model.

13. The method according to claim 1, further comprising:
ranking each of the plurality of distinct algorithmic features of the deep learning model based on the distinct weight value or the distinct coefficient value accompanying each of the plurality of distinct algorithmic features; and
selecting the subset of the plurality of distinct algorithmic features of the deep learning model that satisfy a selection threshold.

14. A method for implementing an interpretive surrogate machine learning model in cooperation with a complex machine learning model, the method comprising:
evaluating structural characteristics of a target complex machine learning model;
identifying a subset of a plurality of distinct algorithmic features of the target complex machine learning model as leading contributors of a subject predictive output of the target complex machine learning model based on the evaluation, wherein the leading contributors relate to algorithmic features of a given machine learning model that satisfy or exceed a contribution threshold for an output of the given machine learning model;

bifurcating the plurality of distinct algorithmic features of the target complex machine learning model into at least two distinct subsets including:
  (a) a first subset that identifies the one or more distinct algorithmic features of the target complex machine learning model that are likely to drive or lead a contribution to a value of an output of the target complex machine learning model, and
  (b) a second subset that identifies the one or more distinct algorithmic features that are likely not to drive the value of the output of the target complex machine learning model, wherein
  the subset of the plurality of distinct algorithmic features comprises the first subset;

constructing a surrogate machine learning model using each of one or more algorithmic features of the target complex machine learning model within the subset of the plurality of distinct algorithmic features;

training the surrogate machine learning model to mirror predictive outputs of the target complex machine learning model;

deploying the surrogate machine learning model and the target complex machine learning model based on a completion of the training; and in response to a same input to both the target complex machine learning model and the surrogate machine learning model, exposing:
  (1) a predictive output of the target complex machine learning model, and
  (2) an explanation of the predictive output of the target complex machine learning model based on one or more leading contributing algorithmic features of the surrogate machine learning model.

\* \* \* \* \*